United States Patent [19]

Sommers

[11] Patent Number: 4,827,872

[45] Date of Patent: May 9, 1989

[54] ANIMAL SHELTER

[76] Inventor: William R. Sommers, Rte. 1, Box 163, Galesville, Wis. 54630

[21] Appl. No.: 148,916

[22] Filed: Jan. 27, 1988

[51] Int. Cl.$^4$ .......................... A01K 1/00; A01K 1/02; A01K 31/00
[52] U.S. Cl. ....................................................... 119/19
[58] Field of Search .................................... 119/19, 20

[56] References Cited

U.S. PATENT DOCUMENTS 3,557,756 6/1971 Ramsey ................................... 119/19

FOREIGN PATENT DOCUMENTS 649581 9/1928 France .................................. 119/16

Primary Examiner—Robert Peshock
Attorney, Agent, or Firm—M. Paul Hendrickson

[57] ABSTRACT

The present invention provides an animal shelter suitably adapted for the sheltering of animals under adverse temperatures. The shelter includes an external enclosure, an internal structure within which the animal is housed, an air passageway circumscribing the internal structure which is disposed between the internal structure and the external structure, and a thermal source for heating or cooling the air within the passageway. The thermal source may be thermostatically regulated to provide a controlled habitat environment.

20 Claims, 3 Drawing Sheets

ANIMAL SHELTER

SUMMARY OF THE INVENTION

The present invention relates to shelters and more particularly to insulated shelters equipped with means for thermally controlling the environmental conditions for the housing of animals.

BACKGROUND OF THE INVENTION

Heretofore a wide variety of outdoor shelters for housing and protecting domesticated animals (e.g. dogs, felines, etc.) against inclimate weather conditions have been proposed. Domesticated animal shelters have heretofore been constructed from pre-cut outdoor grade plywood panels comprised of a floor panel, a roof section, and four sidewall panels (including front and rear sidewall panels the former of which is fitted with an entryway) and a matching pair of sidewalls panels. Insulative materials such as foamed polymeric, fiberglass, blown insulation, etc. are generally unfit for use in the construction of such domesticated animal shelters. Foamed insulative materials generally lack the necessary durability to protect the material from structural damage by the sheltered animal.

The inability to effectively dissipate moisture generated within the animal shelter presents another problem inherently plaguing attempts to incorporate insulative materials into the design and construction of conventional animal shelters. An excessively humid environment within the shelter creates an unhealthy and unsafe shelter environment for small domesticated animals. Such an unhealthy humid environment often leads to joint disease (e.g. arthritis and associated muscular and bone diseases), decay of the structural components, offensive odors and other health hazards to the sheltered animal. Without the need to dispense energy for warmth, the animal can use such energy to ward off disease (e.g. bacterial, fungi, infections, etc.). Consequently, existing animal shelters are primarily designed so as to simply shield the animal against direct exposure to the external environment but afford little, if any, protection towards providing a regulated and desirable habitat for the sheltered animal.

The problems currently associated with the inability to regulate and control the habitat for sheltered domesticated animals is aptly illustrated by owners of expensive hunting dogs within the sub-artic regions of northern United States and Canada. Such hunting dogs in the late fall and early winter months are often fielded from dawn to dusk during which time the hunting dogs expend considerable energy and become extremely dirty in the performance of exhaustive hunting tasks for their owners. The dog's general uncleanliness prevents the owner from temporarily sheltering the dog within the owner's living quarters. Consequently, upon return from the hunt, such hunting dogs are normally fed and sheltered outside. This common practice adversely affects both the general health and hunting life of the dog. The failure to promptly house animals within a warm shelter for a sufficient period of time to revitalize and stabilize the animal's system seriously impairs the animal's resistance against disabling diseases and aging infirmaties. Studies by authoritative experts within the veterinarian field indicate the average hunting dog's productive life is curtailed by at least two years by the deliterious effects these common practices have upon the dog's overall general health.

An outdoor shelter capable of providing a comfortable and warm habitat for a domesticated animal under such sub-artic conditions would significantly extend a dog's productive hunting life. There accordingly exists a long-felt need for an insulated domesticated animal shelter which would more effectively protect an animal against inclimate weather conditions and especially within those sub-artic regions susceptible to extreme seasonal changes. It would be of particular advantage, if it were possible, to provide a cost effective outdoor shelter which would afford a thermally controllable habitat for domesticated animals under sub-artic conditions. An insulated, thermally controllable animal shelter further equipped with means for effectively dissipitating unhealthful humid conditions from the habitat would represent a substantial departure and benefit over existing small animal sheltering practices and shelters.

DETAILED DESCRIPTION OF THE INVENTION

Figure 1:
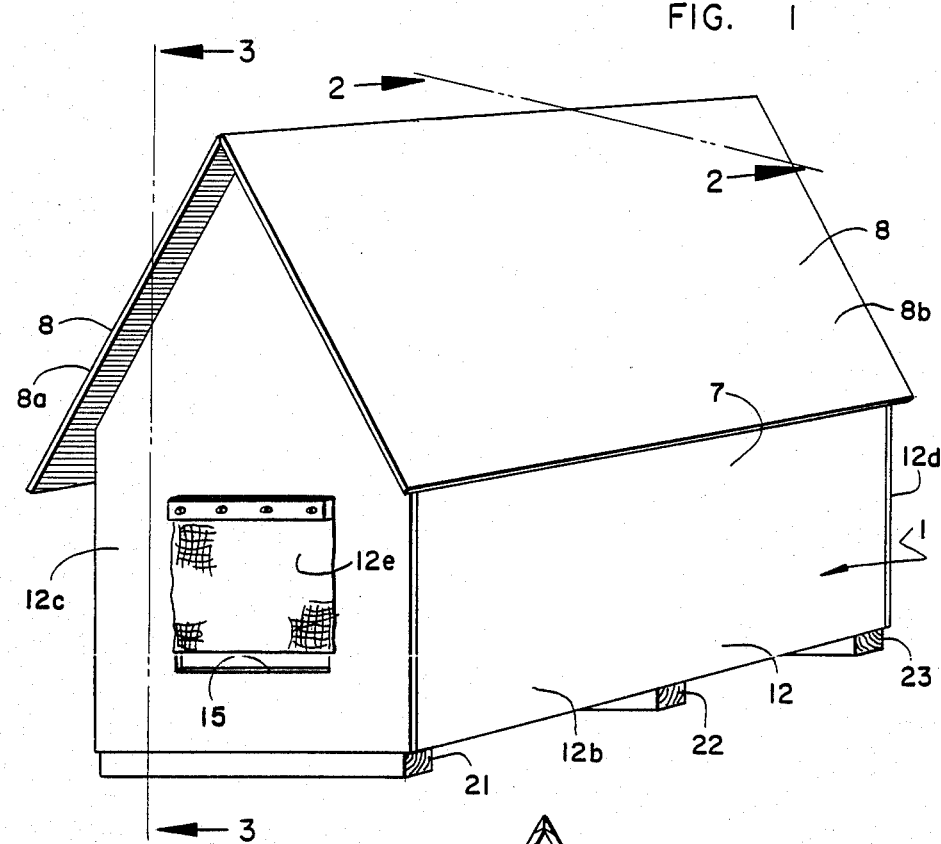
FIG. 1 is an external view of an insulated animal shelter internally equipped with means for thermally controlling the habitat of a domesticated animal.

Referring to the drawings, it will be observed that external view of the animal shelter 1 as depicted in FIG. 1 does not outwardly differ in appearance from conventional animal shelters. The combination of the external and internal components of the animal shelter 1, however, substantially departs from conventional animal shelters with respect to the cooperative effect and the functional interrelationship of its component parts in providing a controlled environment for the outdoor sheltering of an animal. As further illustrated by the cross-sectional views of FIGS. 2-3 and the FIG. 4 elevational side view, the present invention provides an insulated shelter 1 for housing domesticated animals wherein the shelter generally comprises:

(a) an enclosed internal structure 2 (shown in FIGS. 2-4) having an internal cavity generally defining a housing 3 within which a domesticated animal is housed, with said internal structure 2 including an inner floor 4, an inner sidewall unit (generally designated by 5) affixed to said inner floor 4, and an inner ceiling 6 secured to said inner sidewall unit 5, (b) an external enclosure 7 circumscribing said internal structure 2 with said external enclosure 7 including a roof member 8 spaced apart from the inner ceiling 6 so as to provide an intervening roof air cavity (generally designated as 9) therebetween, an outer floor 10 spaced apart from the inner floor 4 so as to provide intervening floor air cavity therebetween (generally designated by 11) and outer wall member 12 extending downwardly from said roof member 8 to said outer floor 10 with a major portion (on a total surface area basis) of the outer wall member 12 being spaced apart from said inner sidewall member 5 so as to provide a sidewall air cavity therebetween (generally designated as 13) with said roof air cavity, said floor air cavity and said sidewall air cavity collectively providing a circumventing enclosed air passageway (collectively designated as 14) disposed between said external enclosure and internal structure so as to permit the circulatory flow of convectional gases within said air passageway 14, (c) housing entryway 15 for ingress and egress of the animal, and (d) means for regulating the temperature of the convectional gases within said air passageway 14 which means is generally designated in the drawings by numeral 16.

The structural components of the animal shelter possess sufficient insulative value so as to permit the air within passageway 14 to be effectively maintained at a thermally controlled regulatable temperature. In order to accomplish a thermally controllable environment within housing 3, the structural components of the external enclosure 7 and the internal structure 2 should possess sufficient insulative effectiveness so as to permit air entrained within air passageway 14 to be maintained at a thermally controllable temperature under sub-artic (e.g. 5° C. or less) wintering conditions. Structural components of wood construction (with or without added insulative materials) such as exterior or marine grade plywood for the external enclosure and either indoor or outdoor construction grade plywoods for the internal structure are generally satisfactory for this purpose. Structural components for the external enclosure fabricated from metallic materials of a higher thermal conductivity will generally necessitate insulative adjuncts to compensate for their inferior insulative capacity. Unfoamed plastic construction materials likewise of a higher order of thermal conductive than the plywoods will also generally require insulative adjuncts to reduce their thermal conductivity. Although conventional foamed polymeric materials (e.g. polyurethane, polystyrene foams, etc.) will normally possess adequate insulative properties to provide a controllable air temperature within air passageway 14, such foamed materials normally lack sufficient durability for use within those animal sheltering areas exposed to animal access. By treating the exposed and accessible areas of such conventional foamed plastic materials with a more durable surface finish (e.g. expodized finish) so as to protect the fragile foam structure from potential animal destruction, such modified foamed products may be converted to a useful construction form. Accordingly, if open or closed celled insulative materials without a protective external sealant are used in the construction, these insulators are advantageously environmentally sealed against direct exposure to internal habitat provided by housing 3. Unprotected insulative materials (upon prolonged usage) also tend to harbor infestations injurious to the animal's health. Alternatively, foamed plastic materials may be used as internally disposed insulative adjuncts in combination with inferior insulators such as the unfoamed plastic and metallic construction materials. The preferred construction materials for both the internal structure and external enclosure directly exposed to animal access are constructed of plywood having a thickness in excess of $\frac{1}{8}$ inch.

The animal shelter 1, as illustrated in the drawings, allows for the convectional flow of gases about the external periphery of internal structure 2. The gas flow within the illustrated shelter traverses and circumscribes the major longitudinal axis of housing 3. As may be observed from FIG. 2, the sidewall air cavity 13 portions of air passageway 14 are accomplished by the spacing the external left sidewall panel member 12a apart from inner sidewall panel 5a and a corresponding spacing apart of the external right sidewall panel member 12b and from inner sidewall panel 5b with the external enclosure front panel 12c and external enclosure rear panel 12d of outer wall member 12 completing the enclosure of the sidewall air cavity 13. The sidewall air cavity 12 directly communicates with the floor air cavity 11 and roof air cavity 9 the combination of which collectively provide an internally disposed air passageway 14 within shelter 1. As will be explained later and as illustrated by the cross-sectional views of FIGS. 2 and 3, an insulative layer 17 (advantageously pervious or permeable to the transfer of vaporous moisture) is interdisposed between inner ceiling 6 and roof member 8 to provide roof air cavity 9 of a comparable size to its communicating sidewall air cavities 13.

The communicating air passageway 14 interdisposed between the internal structure 2 and external enclosure 7 significantly contributes towards the providing of a thermally controllable environment for the sheltering of the animal within housing 3. Excessive spacial distance (e.g. 5 inch or more) or insufficient spacing (e.g. less than $\frac{1}{2}$ inches) between the exterior enclosure 7 and interior structure 2 will tend to substantially diminish the thermal efficacy of the air passageway 14. The convectional gas flow within air passageway 14 not only significantly enhances its thermal efficacy, but also contributes towards a more uniform distribution of heat (e.g. elimination of hot and cold spots) throughout housing 3 and the dissipation or removal of excessive moisture accummulation therefrom. Surprisingly, a relatively small heating unit 16 operated at low power consumption rate will effectively heat and maintain housing 3 at a sufficiently comfortable temperature (e.g. 10°–15° C.) for animal habitation under relatively, frigid sub-artic (e.g. −40° C. or less) conditions.

The spacial distance between exterior enclosure 7 and interior structure 2 should be sufficient to permit the air therebetween to freely convectionally flow within the air passageway 14 as afforded within the shelter by floor cavity 11, sidewall air cavity 13 and roof air cavity 9. The proper spacial distance will partially depend upon the cubic displacement of housing 3 with larger animals generally requiring a larger air capacity than the smaller inhabitants. For most adaptations, the spacial distance will range of about 1 inch to about 4 inches. Spacing apart of the external enclosure 7 from the internal structure 2 at a distance of about 1 inch to about 3 inches (preferably at about 2 inches plus or minus $\frac{1}{2}$ inch) will generally enhance the thermal efficacy of the air passageway 14 and allow for a more effective maintenance a thermally controllable temperature for animal sheltering under sub-artic conditions.

Figure 2:
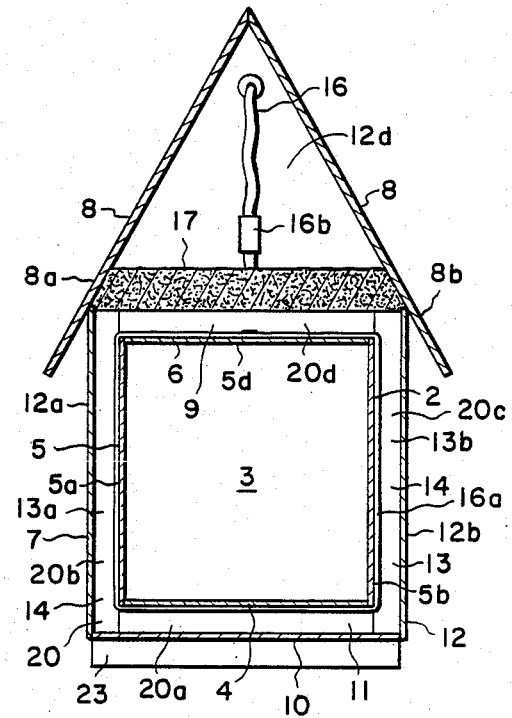
FIG. 2 is a cross-sectional view taken along line 2—2 of FIG. 1 which showing in greater detail the internal construction of the animal shelter.
Figure 3:
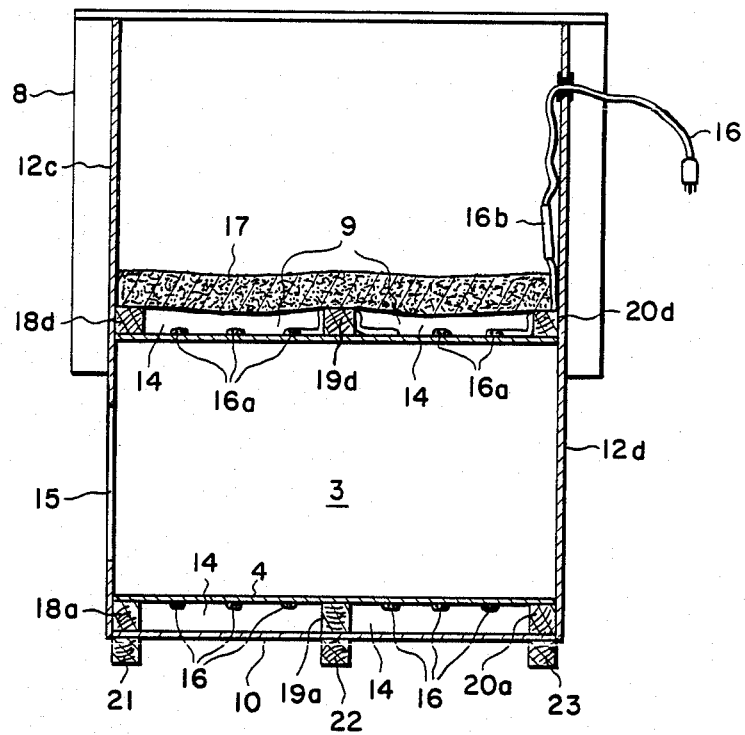
FIG. 3 reveals a cross-sectional view of the shelter construction taken along line 3—3 of FIG. 1.
Figure 4:
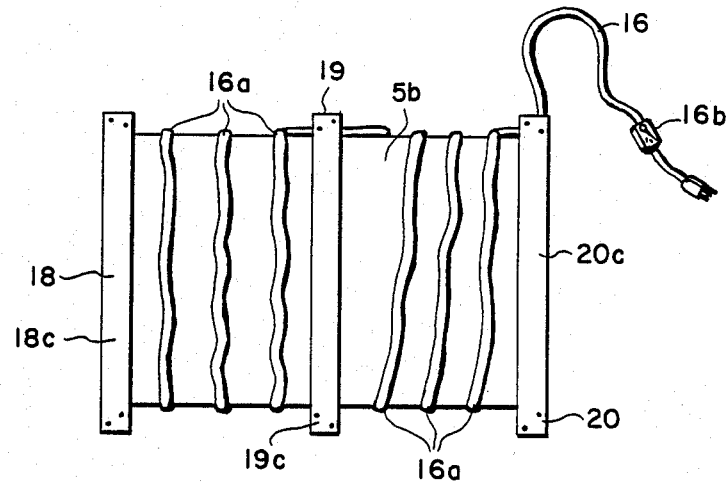
FIG. 4 is a side external view of an internal components of an insulated shelter equipped with means for thermally regulating the sheltering temperature.

With reference to particular embodiments depicted in FIGS. 2-4, a plurality of spacing units externally and transversely circumscribing the major longitudinal axis of internal structure 2 are utilized for this purpose. The plurality of spacing units (as depicted in the FIGS. 2-4) comprise a frontal spacing unit (generally designated as 18), a middle spacing unit (generally designated as 19) and a rear spacing unit (generally designated as 20). In an animal shelter of the size illustrated in the drawing, the middle spacing unit 19 contributes to structural strength and serves to divide the air passageway into two equivalent sections for more effective control of the heated air within passageway 14. In smaller sized shelters, the air passageway 14 spacing unit dividers may be eliminated while larger shelters are advantageously provided with one or more air passageway spacing unit dividers in proportionate to the shelter size (e.g. such as about 6 to about 14 inches between spacing units).

Each spacing unit includes four spacing sub-units so as to provide individual spacing sub-units for each of the internal structure paneling components. The frontal 18, middle 19 and rear 20 spacing units each include spacing sub-units interdisposed between the inner floor 4 and the outer floor 10 (i.e. 18a, 19a, and 20a), left sidewall spacing sub-units (18b, 19b, and 20b which separate the exterior sidewall panel 12a from interior panel 5a), right sidewall spacing sub-units (18c, 19c, and 20c), separating exterior panel 12b from inner panel 5b and ceiling spacing sub-units referenced in FIGS. 2–4 as 18d, 19d, and 20d.

In general, the means for thermally controlling the habitat temperature comprises a thermal source 16 for heating and/or cooling the air within passageway 14, and advantageously a thermal source thermostatically responsive to temperature fluctuations within the shelter so as to automatically engage or disengage the thermal source to provide the appropriate habitat temperature for housing 3. The animal shelter as specifically illustrated in the drawings is particularly well suited for insulatively protecting and housing an animal at temperatures ranging from about −40° C. or lower to about 15° C. It will be also observed from the drawings that the design and construction of the animal shelter does not necessarily require any insulative material supplementation. The air passageway 14 in conjunction with heating means 16 and the heat generated by the housed animal affords sufficient insulative and heat retention capacity to adequately protect the housed animal against the deliterious effects of extreme coldness.

Surprisingly, a relatively small amount of heat is needed to maintain a comfortable habitat under frigid, sub-artic sheltering conditions. The heat source for the heated passageway air may be supplied by an external heat source (e.g. insulated heat conduit from a heated shelter into passageway 14) or by an internally disposed heat source supply. However, contol of the shelter habitat temperature is most appropriately accomplished by an internal thermostatically controlled heat source. Electrical heating devices equipped with thermostatic means of regulating the heat supply connected to an electrical power source may be effectively used for this purpose. Such an electrical heating device may suitably include means for thermostatically and responsively supplying heat to the habitat as may be periodically required to warm the habitat under the wide temperature fluctuations of the sub-artic regions. Electrical heating devices currently used as pipe wraps in sub-artic regions to prevent freezing of piped liquids (e.g. water pipes) have been found to be exceptionally well suited for this purpose. Such pipe wrap heating devices are commonly available at hardware and other retailing outlets. Numerous variations of these pipe wrap heating devices are known.

A common variation of a thermostatically controlled pipe heating devices generally includes electrically resistant wires (often referred to as the tape) operatively connected to a controller which responsively regulates current flow in response to a temperature sensor. A variety of such temperature sensing controllers are currently available, such as conventional thermostatic devices using compound bar temperature sensing elements. Thermocouples, pn junctions, varistors and the like can be used with solenoid or electronic relays to turn current on and off with temperature. A temperature sensitive resistance element can control a voltage variable oscillator with a counted down output driving SCRs or triacs to turn power on and off at an appropriate rate to control temperature. Use of zener diodes or other threshold devices can set the commencement temperature at any desired point.

Another commercial variation of such pipe heaters comprises a pair of parallel electrical conductive wires enshrouded or embedded within a continuous core of a resistive composition (e.g. a semi-conductive plastic core) having a negative temperature coefficient of conductivity. The resistive composition decreases in resistance as the temperature goes down which in turn increases the current flow through the resistive composition. The power (and heat) dissipated by the resistive composition increases with increasing current flow. This particular type of heating cable does not require a thermostat. The compositional characteristics of the semi-conductive core primarily determines the quantum of heat generated by the heating cable. The amount of heat supplied along each point of the heating cable will depend upon the particular temperature of the resistive composition at that point.

A comfortable sheltering temperature (in the absence of the housed animal) will normally range from about 5° C. to about 20° C. and most usually from about 10° C. to about 15° C. The pipe wrapping heating devices most commonly available are typically equipped with thermostatic means of engaging the heating element at a temperature slightly above the freezing point (e.g. about 1° C. to about 4° C.) Although the heating of the circulatory air within the air passageway of the present shelters to a temperature slightly above freezing represents an improvement over existing animal shelters, a more comfortable habitation temperature is achieved by heating the air passageway temperature to at least 5° C. and preferably to at least 10° C.

The specific means for controlling the habitat temperature, as shown in the drawings, comprises a thermostatically controlled heating tape 16a (uniformly wound about the longitudinal exterior surface of the internal structure 2) equipped with a thermal sensor 16b responsively connected to a controller which automatically engages or disengages the current flowing through the heat tape 16a when the sensory temperature falls below about 3° C. The invention, as depicted in the drawings illustrates a manner in which an inexpensive pipe wrapping heating device thermostatically designed to disengage the heating source at a temperature less than 5° C. may be effectively utilized to heat the air passageway to a higher temperature. With reference to FIGS. 2–3, it will be observed that there is included an insulative barrier 17 which separates roof air cavity 9 from the balance of the peaked roof head space. The insulative barrier permits the heated air entrained within air passageway 14 to be maintained at a higher temperature than the air above insulative barrier 17. By positioning the heat sensor 16b above the insulative barrier 17, a conventional pipe heating device equipped with a heat sensor 16b thermostatically designed to engage heating tape element 16a at a lower temperature (as sensed in the head space) may be operationally modified to provide a higher air passageway heating temperature. By this technique a conventional pipe wrap heat tape device may be modified in the absence of the housed animal to provide a housing temperature within about 10° C. to about 15° C. range.

In the shelter manufacture, the structural component parts may be appropriately pre-cut so that they may be easily assembled together. The components may be appropriately varied structurally and dimensionally to its intended inhabitant. For illustration purposes, it is assumed that it is desirous to manufacture an animal shelter suitable for habitation by a medium size dog (e.g. basset hound, beagle). The internal sidewall and ceiling structural components for such a shelter may be appropriately pre-cut from $\frac{1}{4}$ inch construction grade plywood paneling. The inner structure should be of a design and construction to permit a heat exchange from inner passageway 14 to housing 3. For structural support purposes, plywood paneling at least $\frac{3}{8}$ inch thick is desirably used to fabricate inner floor 4. The inner right sidewall panel 5a and inner left sidewall 5b (e.g. each measuring 36 inches×20$\frac{1}{4}$ inches), an inner ceiling 6 and an inner floor 4 (e.g. each measuring 36×20$\frac{1}{4}$ inches) may likewise be pre-cut from the plywood sheets so as to provide (when assembled together) a rectangularly cubical internal cavity for the animal.

The sub-units for the front 18, rear 19, and middle 20 spacing units may be appropriately pre-cut from 1$\frac{7}{8}$ inch square construction grade studding lumber (such as douglas fir, etc.) to provide for air passageway spacing. Spacing sub-units 18b, 18c, 19b, 19c, 20b, and 20c (which correspondly abut onto inner right sidewall panel 5a and inner left sidewall panel 5b) may be suitably cut to a length to match the width of inner panels 5a and 5b. The middle 19a and 19d, front 18a and 18d, and rear 20a and 20d sub-units (which abut into the inner floor 4 and inner ceiling 6) may be cut an extra 3$\frac{3}{4}$ inches greater in length than the width of the inner floor 4 and inner ceiling 6. The additional margining permits the overcut inner floor 4 and ceiling 6 spacing sub-units to flushly overlap and squarely corner onto the spacing sub-units which abut onto inner left panel 5a and right inner panel 5b. The margining is also needed to maintain the left 12a and right 12b sidewall members correspondly apart from the internal structure 2 and for the purpose of providing a continuous air passageway 14 which completely circumscribes the internal structure 2 along its major longitudinal axis as illustrated in FIGS. 2 and 3. This particular construction design also allows the exterior paneling components to squarely fit onto the planar axis formed by these spacing sub-units.

In animal shelters constructed from wood, the insulative efficacy of the shelter is significantly enhanced by the utilization of exterior paneling materials measuring at least $\frac{3}{8}$ inch in thickness (advantageously at least $\frac{1}{2}$ inch thick and preferably from about $\frac{5}{8}$ to about $\frac{3}{4}$ inch) such as exterior or marine grade plywood. The thicker plywood materials (e.g. at least $\frac{1}{2}$ inch thickness) are particularly well suited for the front 12c and rear 12d external enclosure panel members. Plywoods paneling materials of a thicker construction may be used, if desired, but generally are not required to provide an adequate insulative barrier. If other construction materials are used, the external enclosure paneling materials will advantageously provide an insulative R value at least comparable to that provided by the plywood paneling components.

The left external sidewall 12a and right external sidewall 12b paneling components may be likewise appropriately pre-cut so as to correspondly match the dimensional size of inner right sidewall 5b and inner left sidewall 5a paneling (e.g. 36×24$\frac{1}{2}$ inches). As may be observed from Figures, the configuration of the front exterior panel 12c and rear exterior panel 12d basically comprises a rectangular lower portion (e.g. measuring 25 inches in width and 24$\frac{1}{2}$ inches in height) and an upper isosceles triangular portion peaking 48 inches from the lower portion (i.e. centermost bottom point of the base). The lower portion for both the front 12c and rear 12d exterior enclosure panels are appropriately sized so as to complete the enclosure of the internal structure and to interfacially cover the abutting floor and sidewall spacing sub-units, the $\frac{1}{2}$ inch outer floor 10 edge and the $\frac{3}{4}$ inch thick edge of the left 12a and right 12b sidewall panel members. An entryway 15 is pre-cut from the base portion of front exterior panel 12c and fitted with entryway covering 12a as illustrated in Figures. The rear exterior enclosure panel 12d is provided with an electrical cord outlet aperature preferably placed above the air passageway near the rear exterior roof.

The roof member 8 includes a left roof member 8a and right roof member 8b (e.g. each measuring 45 inches in length and 33 inches in width) pre-cut from $\frac{3}{4}$ inch exterior or marine plywood paneling. The shelter 1 also includes three chemically treated beam supports (21, 22, and 23) underpinning exterior floor base 10 for purposes of providing an air space therebetween and protecting the shelter against decay.

The pre-cut wooden shelter components may be readily assembled together by initially securing (e.g. gluing, nailing, screwing, etc.) the appropriate spacing sub-units onto the corresponding inner floor 3, inner left sidewall panel 5a, inner right sidewall panel 5b, and inner ceiling panels. Each of the sub-units of the frontal spacing units 18 and rear spacing unit 20 are respectively longitudinally squared with the front and rear widthwise edges of the internal structure paneling components so as to provide an squared surface edge for the subsequent securance of the corresponding front exterior panel 12c and rear exterior panel 12d thereto. The sub-units of the middle spacing unit 19 are centered in parallel relationship to the frontal 18 and rear 20 spacing units so as to provide two separate air passageways of an equivalent size. Although the inclusion of middle spacing unit 19 may be omitted from the shelter 1 construction, it generally contributes structural strength to the larger shelters. After the respective air spacing sub-units have been secured onto the appropriate inner structure panel components, the internal structure 2 components may then be assembled together into a rectangularly-shaped cube the opposing longitudinal ends of which are open for the corresponding securance thereto of exterior front panel 12c and exterior rear panel 12d.

As illustrated in FIGS. 2 and 3, the extra lengthwise $\frac{1}{4}$ inch widthwise margin of inner ceiling panel 6 and inner floor panel 4 permits the $\frac{1}{4}$ inch thick inner left sidewall panel 5a and right sidewall panel 5b to be firmly nestled against (in a squared relationship) the inner ceiling 6 and inner floor 4 panel components. Although it is generally unnecessary to apply an adhesive sealant at the interfacing paneling joints, such sealants may be used, if desired, to further strengthen the internal structure 2 and insulative seal the abutting inner panel components against seepage of air into housing 3. The abuttingly mating extending margins provided by spacing sub-units 19a, 19d, 18a, 18d, 20a and 20d when respectively securely affixed onto the corresponding interfacing cross cut edges of 19b, 19c, 18b, 18c, 20b, and 20d further strengthens the overall structural integrity of the shelter 1 (including the internal structure 2) while also improving upon the insulative barrier and detering air seepage from air passageway 14 into the external environment. Although conventional wood adhesvies may be effectively used to join together the extending portions of the sub-units interfacially abutting onto sub-unit cross cut edges, assemblage of internal structure 2 is generally expedited by the nailing (with or without wood adhesives) of the sub-units and paneling components together.

The heating tape may be secured onto the exterior surface of the internal structure paneling by heating duct tape, cable fasteners, brads, or other appropriate insulative securing means. Spacing sub-units 19d and 20d may be provided with grooves for transversal of the heat tape 16a therethrough. After the heat tape has been spirally wrapped about the internal structure, the exterior floor 10 may be appropriately secured onto the inner floor spacing sub-units 18a, 19a, and 20a, with spacing rafters 21, 22, and 23 thereafter being secured onto the exterior of floor 10. The exterior left 12b and right 12a side paneling members may then be respectively centered and secured onto the correspondingly left spacing sub-units 18b, 19b, and 20b and right spacing sub-units 18c, 19c, and 20c followed by assemblage of the exterior front panel 12c and exterior rear panel 12d onto the interfacing surfaces of the front spacing unit 18 and rear spacing unit 20 to provide the assembled insulated domesticated animal shelter as depicted in FIG. 1.

Figure 5:
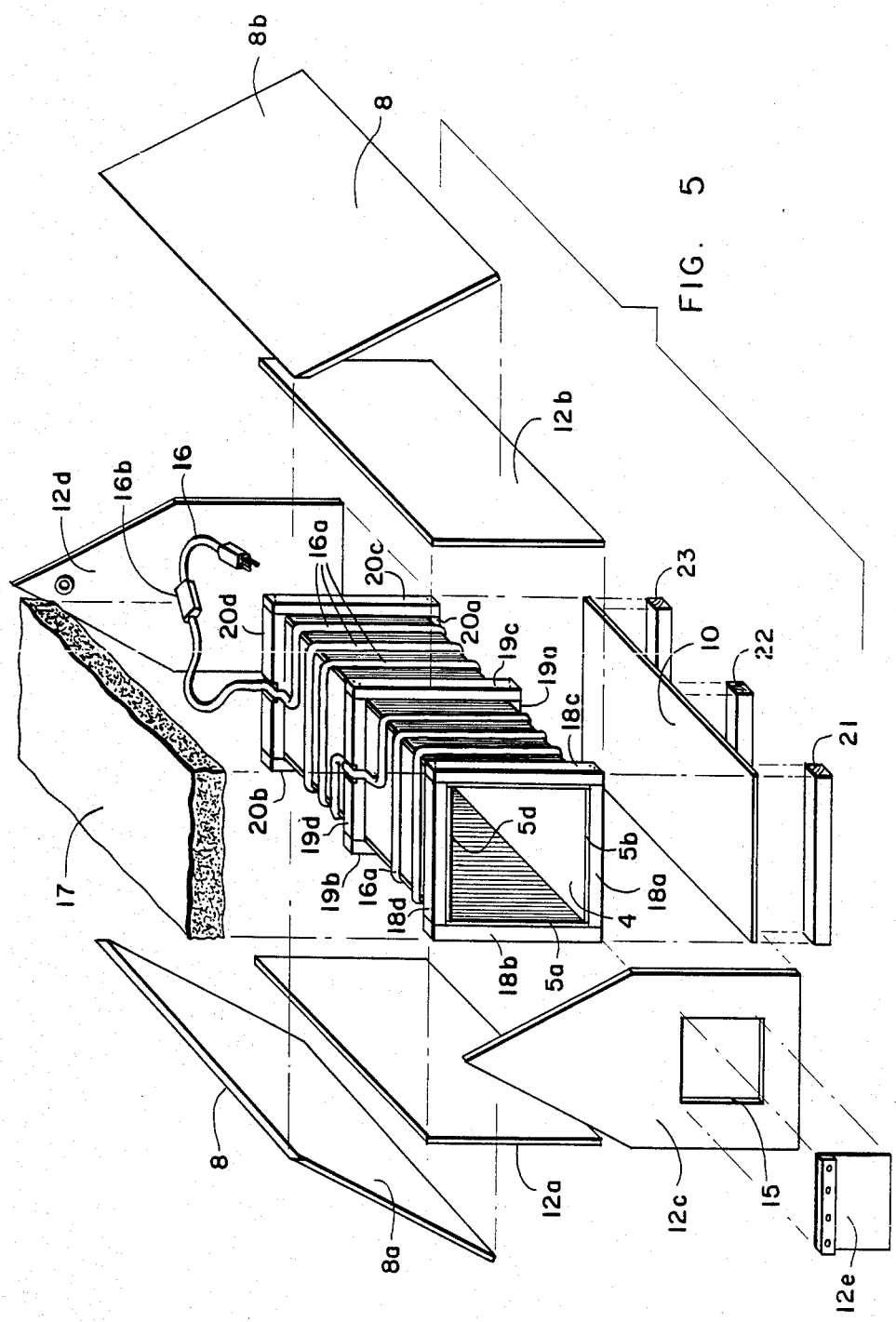
FIG. 5 is a view of the various component parts of the shelter in an unassembled form.

As mentioned before, the head space between the inner ceiling 6 and the exterior roof panels (7a and 7b) is substantially greater than that afforded by the spacing sub-units 18d, 19d, and 20d. In the preferred embodiments of this invention, the head space between the exterior roof panels (7a and 7b) may be used to advantage as an insulative barrier and to dissipitate or vent excessive vaporous moisture from the air passageway 14. An insulative barrier 17 substantially pervious to the transfer of vaporous moisture from the air passageway 14 into the roof cavity 9 (such as fiberglass or other open celled insulative materials, etc.) but possessing sufficient insulative capacity to substantially maintain the gases within the air passageway 14 positioned below the insulative barrier at an effective thermal temperature for heating housing 3 may be effectively used for this purpose. As illustrated in FIG. 5, a fiberglass insulative material (such as those conventionally used to insulate dwellings) is placed upon ceiling spacing sub-units 18d, 19d, and 20d. Small slats (not shown) may be transversely positioned above the spacing sub-units 18d, 19d, and 20d for purposes of supporting the insulative barrier. The roof air cavity 9 height of air passageway 14, thus corresponds to that of the sidewall air cavity 13 and floor cavity 11. The insualtive value of the insulative roof barrier 7 may be varied as may be the head space area between it and the roof panels 7a and 7b. The insulative barrier for sub-artic applications will advantageously be equivalent to a 1 inch thick (preferably at least a two inch thick) fiberglass insulative material.

It should also be noted that the means for heating and dissipitating humidity for the shelter during the cold winter months in sub-artic climates, may also be used to advantage during the summer months. The insulative barrier afforded by the intervening air passageway 14 insulatively protects the animals' housing 3 from direct heat penetration into housing cavity. If desired, venting ports may be appropriately positioned (e.g. along upper portions of the front and rear external panels) to permit venting of heated air from the shelter.

The design and construction of the present animal shelter also provides a basic structure which may be readily adapted to an air conditioned shelter. This may be accomplished by the incorporation of cooling conduits (e.g. water conduits of air conditioning piping) operatively connected to a cooling source so as to permit cooling of the convectional air within the air passageway 14 to a comfortable habitation temperature for the animal. Other cooling means for introducing cooled air into air passageway 14 may also be used for cooling the shelter.

The animal sheltering devices of this invention may be made in a variety of shapes (e.g. alpine, circular, polyogonal, etc.) and sizes. Feline shelters of an alpine shape equipped with shorter thermostatically controlled pipe wrap heating devices for heating the air passageway may be conveniently manufactured from the cut-out scrap pieces from 4'×8' plywood paneling of the dog shelters herein. Similarly animal shelters herein may be used to provide a comfortable habitat during the winter and summer months for zoo animals, reptiles and birds.

The following example is illustrative of the invention.

EXAMPLE

Two animal shelters for: (A) a medium sized (e.g. 32 pound) dog; and (B) a 76 pound hunting dog, were constructed. Exterior construction grade plywood was used in the fabrication of the wood paneling construction components, douglas fir stripping (1⅜ inch square) as spacing units for the air passageway and chemically treated beams for the underpinning of the outer floor. The wood components for the larger sized shelter were pre-cut in accordance with the following specifications:

| Components | Width | Length | Thickness |
|---|---|---|---|
| Plywood panels | | | |
| inner sidewalls (2) | 26¼" | 42" | ¼" |
| inner ceiling (1) | 25¼" | 42" | ¼" |
| inner floor (2) | 25¾" | 42" | ¼" |
| outer floor (1) | 30" | 42" | ½" |
| outer sidewalls (2) | 31" | 42" | ½" |
| roof sections (2) | 39" | 51" | ½" |
| Other lumber components | | | |
| spacing sub-units (8) | | 30" | 1⅜" |
| spacing sub-units (8) | | 25¾" | 1⅜" |
| underpinning shelter beams (4) | | 30" | 1⅜" |

The exterior front and rear paneling sections for the larger shelter were pre-cut from ½ inch thick exterior plywood paneling measuring 4 feet from base to peak in height, 31 inches across the base, and 30 inches in height from the base bottom of the roof eave. The medium sized shelter was constructed in accordance with the specifications as defined in the Detailed Description of the Invention preceding the Example.

A conventional six (6) inch thick and R value 19 home construction fiberglass insulation was used as the insulative barrier for both shelters. The medium sized shelter was equipped with a 40 foot pipe wrapping heat tape (ET-40, manufactured by Easy-Heat Inc., U.S. 20 East, New Carlise, IN 46552), while the larger sized hunting dog shelter was equipped with a 50 foot pipe wrapping heat tape (ET-50 by the same manufacturer).

Each shelter was assembled from the aforementioned components as described hereinbefore in the Detailed Description of the Invention. The wood components were nailed together without the use of a wood adhesive. The heat tapes for each shelter was uniformily wound about and secured to the internal structure by plastic brackets and conventional heat duct tape to the exterior surface internal exclosure paneling surfaces. The middle ceiling sub-units were grooved ($\frac{3}{4}'' \times 1\frac{1}{2}''$) to permit insertion of the heating tape and winding of the tape about the internal structure paneling members. The thermostatic regulators for automatically switching on and off the heating tapes were positioned above the fiberglass insulator and the electrical chord outlet apertures were cut in the rear exterior panel near the roof peak for each shelter. Three lengthwise slats ($\frac{1}{4}'' \times 2''$) for each shelter were uniformly positioned crosswise onto the ceiling spacing sub-units to provide support for the fiberglass insulation and to maintain a $1\frac{7}{8}''$ air passageway therebetween. The fiberglass insulation layer was placed upon the slats with its paper backing facing upwardly towards the roof peak and flushed against the interior surfaces of the exterior panels so as to provide an insulative sealed barrier across the entire upper roof cavity and interfacing abutment onto the external structural panels.

The interior surfaces of the two outer sidewall paneling and interior outer floor surfaces for each shelter were covered with 90 pound tar paper followed by an overlay of thin aluminum foil (household type) stabled onto the tar paper and each panel. The inclusion of the tar paper and aluminum foil provided a reflective insulative surface to permit more effective transfer to heat into each habitat housing while also facilitating a more effective moisture vaporization and protection of the wood components against dry rot.

The heat tapes were thermostatically equipped to engage the heating cable at 36°-38° F. and at power consumption of 3 watts per cable foot. The inner surface of the roof panels were left uninsulated to provide a temperature differential between the roof peak air and the passageway air. This permitted the thermostatically pipe wrap heating tapes to responsively engage the heat tape at about a 10° C. higher temperature differential than that actually existing within the air passageway. The outer surface of the roof panels were covered with tar paper (90 pound felt) and a 90 pound full lap roofing overlay.

A heavy canvas for each shelter was used as the animal entryway covering. The top margin of each canvas covering was secured above each entryway by a $1'' \times 2''$ wood strip overlaying the canvas and bolted (4 bolts) across and above the animal entryway with a 1 inch loose canvas overlap being provided along each of the entryway sides leaving a $1\frac{1}{2}$ inch open space above the entryway base. The canvas entryway covering for the entryway afforded easy animal access to the shelter while also providing sufficient protection against substantial heat loss and the external inclimate weather conditions. Shelter B was equipped with a 16 inch diameter circular entryway. The shelter exteriors were painted with two coats of paint. The shelters were then subjected to testing under sub-artic test conditions.

For comparitive purposes, an insulated dog shelter of matching external dimensions to the medium sized shelter above was also constructed. The construction of this shelter included a $\frac{3}{4}$ inch exterior grade plywood, a $1\frac{1}{2}$ inch styrofoam insulation (construction grade) sandwiched between a $\frac{1}{2}$ inch interior construction grade plywood paneling which defined the internal confines of the housing. The entire external surface of this comparative shelter was covered with full lap roofing (90 pound). Straw was placed upon the interior housing floor of this structure for the purpose of affording additional insulative protection. This comparative shelter was not equipped with the air passageway, pipe wrap heat tape, spacing units or ceiling insulative barriers of shelters A and B above.

Each shelter was paired with a dog matching the shelter size beginning in late summer during which time each dog inhabited its own shelter. Testing of the animal shelters was continued under sub-artic conditions into winter months during periods in which the temperature remained for several continuous days at below 0° F. to −35° F. Periodic temperature readings (without the housed animal) under these sub-artic conditions for shelters A and B consistently yielded a housing temperature within the 50°-55° F. while the comparative shelter tended to equilabrate to the frigid outside temperature.

Temperature checks with the dogs lodging in shelters A and B revealed a uniformily comfortable dog habitation temperature throughout the 32° F. to −35° F. range. In contrast, shelter C become uncomfortably cold below freezing and especially more pronounced when the temperature dropped below 0° F. When the outside temperature dropped below freezing, the dog normally inhabitating the comparative shelter C would lodge with the shelter B dog. Upon return of the spring and warmer summer months shelter C was again inhabited.

The dogs housed within the shelters A and B maintained excellent health without any deleterious effects being observed, notwithstanding the frigid wintering conditions. The canvas entryway covering of shelter C evidenced substantial animal abuse and required frequent replacement whereas the canvas convering for both shelters A and B revealed no abuse other than ordinary wear.

The pipe wrapping heat tape remained operational without failure and required a very small amount of power usage throughout the wintering months. The electrical heating system as incorporated into the animal shelter did not create any safety or fire hazards to the housed animal. Inspection of the interior structure and exterior enclosure wooden components of shelters A and B indicated no moisture accumulation or dry wood rot. The comparative structure C, however, within the same test period revealed considerable moisture accumulation within the internal structure and extensive dry rot extending three inches above the shelter floor.

The insulative barrier positioned between the roof member and the inner ceiling, when used, will generally have an R value of at least 5, advantageously of at least 10 and preferably in excess of 15. Although closed celled insulative materials may be used, such closed celled insulative materials may be suitably provided venting means which would enable the excess moisture to escape from the air passageway.

What is claimed is:

1. An animal shelter adapted to provide a thermally controlled environment for domesticated animal habitation, said shelter comprising:
   (a) an enclosed internal structure having an internal cavity generally defining a housing for habitation by an animal, with said internal structure including an inner floor, an inner sidewall unit affixed to said inner floor, and an inner ceiling secured to said inner sidewall unit;
   (b) an external enclosure circumscribing said internal structure with said external enclosure including a roof member spaced apart from the inner ceiling so as to provide an intervening roof air cavity therebetween, an outer floor spaced apart from the inner floor to provide intervening floor air cavity therebetween and outer wall member extending downwardly from said roof member to said outer floor and spaced apart from said inner sidewall member so as to provide a sidewall air cavity therebetween, with said roof air cavity, said floor air cavity and said sidewall air cavity collectively providing a circumventing enclosed air passageway disposed between said external enclosure and internal structure so as to permit the circulatory flow of gases within said enclosed air passageway and to maintain gases entrained therewithin at a thermally controllable temperature;
   (c) an entryway for animal ingress and egress; and
   (d) a thermal source for altering the temperature of the gases within said enclosed air passageway.

2. The shelter according to claim 1 wherein the inner floor and the outer floor base are spaced sufficiently apart so as to provide a substantially unobstructed internal air space therebetween measuring at least one inch in height.

3. The shelter according to claim 2 wherein the outerwall member includes a first outer sidewall and a second outer sidewall positioned oppositely from said first outer sidewall, and said inner sidewall unit includes a corresponding first inner sidewall and second inner sidewall respectively spaced sufficiently apart from said first and said second outer sidewall to provide a sidewall air cavity therebetween of at least one-half inch.

4. The shelter according to claim 3 wherein the first inner sidewall and the first outer sidewall, and said second inner sidewall and said second outer sidewall are spaced sufficiently apart so as to provide a sidewall air cavity therebetween ranging from about 1 to about 4 inches.

5. The shelter according to claim 4 wherein the shelter includes an insulative material interdisposed between the roof member and the inner ceiling to form an intervening insulative barrier between the said roof member and said inner ceiling, with said insulative material being spaced apart from said inner ceiling to provide an insulated inner roof air cavity directly communicating with said sidewall air cavity.

6. The shelter according to claim 5 wherein the thermal source for altering the temperature comprises a low wattage heating tape element positioned within said air passageway.

7. The shelter according to claim 6 wherein the heating tape is wrapped about the internal structure and spaced sufficiently apart so as to provide a substantially uniform distribution of heat within the internal cavity of said housing.

8. The shelter according to claim 4 wherein the thermal source includes thermostatic controlling means for controlling the amount of heat generated by the thermal source.

9. The shelter according to claim 5 wherein the thermal source comprises a heating tape equipped with a thermostatic regulator, thermal sensor and heating cable uniformily wrapped about the internal structure and the thermal sensor is positioned above the insulative barrier.

10. The shelter according to claim 9 wherein the heating tape is equipped with a thermostatic regulator which engages a heating element of the heating tape at a temperature of less than 5° C. and the positioning of the thermal sensor within the shelter is at a colder environment so as to heat the air within air passageway to a temperature in excess of 10° C.

11. The shelter according to claim 4 wherein the thermal source thermostatically controls the amount of generated heat to heat the housing to a temperature ranging from about 5° C. to about 15° C.

12. The shelter according to claim 4 wherein the thermal source includes means for cooling the temperature of the air within the air passageway.

13. An insulated animal shelter, said shelter comprising an enclosed internal structure generally defining an internal structure for housing a domesticated animal with said internal structure including an inner floor, an inner sidewall unit and an inner ceiling, an external structure circumscribing said internal structure, an enclosed circumventing air passageway disposed between said external structure and said internal structure, an entryway for ingress and egress of an animal to said shelter and means for regulating the temperature within the enclosed air passageway of said shelter.

14. The shelter according to claim 13 wherein said enclosed internal structure includes an internal entryway, an inner floor, an inner sidewall unit secured onto said inner floor, and an inner ceiling; and said external structure includes an outer floor base member spaced apart from said inner floor in a substantial parallel relationship thereto so as to provide an internally disposed floor cavity therebetween, an outer wall member secured onto said floor base member and spaced apart from said inner sidewall unit in substantial parallel relationship thereto so as to provide an internally disposed sidewall cavity between said outer wall member and said sidewall unit, a roof member secured onto said outer wall section and spaced apart from said inner ceiling so as to provide an internally disposed roof air cavity therebetween, an outer entryway which in conjunction with the inner entryway affords access for said animal into and from the shelter, with said internally disposed floor cavity said internally disposed roof cavity and said internally disposed sidewall cavity forming a substantially continuous and enclosed air passageway between said internal structure and said external structure so as to permit the convectional flow of air therewithin.

15. The animal shelter according to claim 13 wherein the means for regulating the temperature within the passageway includes a low wattage electrical heating tape positioned about the exterior perimeter of said inner sidewall unit, said inner floor, and said inner ceiling.

16. The animal shelter according to claim 15 wherein the means for regulating the temperature includes a thermostatic sensor and automatic control switch for operatively engaging the heating tape and heating the air within the circumscribing air passageway at a predetermined temperature and disengaging the heating tape when the air within the passageway is heated to a predetermined temperature.

17. The shelter according to claim 14 wherein an insulative barrier having an R value of at least 15 is spaced apart from the inner ceiling to provide an insulated roof air cavity communicating with said internally disposed sidewall cavity.

18. The shelter according to claim 17 wherein the inner floor and inner sidewall unit of said internal structure and the outer floor and the other wall member of said external structure are spaced apart at a distance of ranging from about one to about three inches.

19. The shelter according to claim 18 wherein an insulative barrier forms a thermal barrier between the air passageway and a roof head space positioned within the external structure and above said insulative layer; the means for regulating the temperature within said enclosed air passageway comprises a low wattage electrical heating tape element wrapped about the outer periphery of said internal structure within said air passageway and a thermostatic device for engaging the heating tape element at a temperature of less than 5° C. being positioned within the roof head space, with the positioning of said thermostatic device within the head space and outside of said air passageway thereby permitting the air passageway to be heated to a temperature of at least 5° C. greater than the temperature sensed by said thermostatic device.

20. The shelter according to claim 13 wherein the means for regulating the temperature comprises a means for cooling the temperature within the air passageway.

* * * * *